United States Patent
Ram (10) Patent No.: US 11,156,891 B1
(45) Date of Patent: Oct. 26, 2021

(54) MULTICOLOR, SINGLE ACTIVE LAYER ELECTROCHROMIC DEVICES

(71) Applicant: University of South Florida, Tampa, FL (US)

(72) Inventor: Manoj Kumar Ram, Palm Harbor, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 62 days.

(21) Appl. No.: 16/161,667

(22) Filed: Oct. 16, 2018

Related U.S. Application Data (60) Provisional application No. 62/572,775, filed on Oct. 16, 2017.

(51) Int. Cl.
*G02F 1/163* (2006.01)
*G02F 1/1516* (2019.01)

(52) U.S. Cl.
CPC .......... *G02F 1/15165* (2019.01); *G02F 1/163* (2013.01)

(58) Field of Classification Search
CPC ....................................................... G02F 1/163
See application file for complete search history.

(56) References Cited

U.S. PATENT DOCUMENTS

| | | | | |
|---|---|---|---|---|
| 4,231,641 A * | 11/1980 | Randin | ................. | G02F 1/1525 204/242 |
| 4,807,977 A | 2/1989 | Sammells | | |
| 5,780,160 A * | 7/1998 | Allemand | ................. | G02F 1/15 359/265 |
| 7,884,995 B2 * | 2/2011 | Tonar | ..................... | G02F 1/161 359/273 |
| 2004/0074779 A1 * | 4/2004 | Sotzing | ................. | H01B 1/127 205/414 |
| 2005/0079386 A1 * | 4/2005 | Brown, Jr. | ............. | B82Y 10/00 428/690 |
| 2005/0117192 A1 * | 6/2005 | Enomoto | ................ | G02F 1/157 359/265 |
| 2013/0258440 A1 * | 10/2013 | Eaton | ..................... | G02F 1/163 359/275 |

FOREIGN PATENT DOCUMENTS

| | | | |
|---|---|---|---|
| CN | 101824145 A | * | 9/2010 |
| JP | 07207260 A | * | 8/1995 |

OTHER PUBLICATIONS

CN101824145A English abstract (Year: 2010).*
CN101824145A English translation (Year: 2010).*
Durmus, Asuman, et al., "A neutral state green polymer with a superior transmissive light blue oxidized state", Chemical Communications, 2007, pp. 3246-3248, The Royal Society of Chemistry, DOI: 10.1039/b704936f.

(Continued)

*Primary Examiner* — Charlie Y Peng
(74) *Attorney, Agent, or Firm* — Quarles Brady LLP; Yakov Sidorin (57) ABSTRACT

In one embodiment, an electrochromic device includes a single unitary active layer including a dye having a nitrogen group and a conducting polymer having a nitrogen group, wherein the active layer has a first color in an oxidized state and a second color in a reduced state, and wherein the electrochromic device comprises no other active layer.

12 Claims, 11 Drawing Sheets
(6 of 11 Drawing Sheet(s) Filed in Color)

(56) References Cited

OTHER PUBLICATIONS

Shi, Pengjie, et al., "Broadly Absorbing Black to Transmissive Switching Electrochromic Polymers", Advanced Materials, 2010, pp. 4949-4953, vol. 22, WILEY-VCH Verlag GmbH & Co. KGaA, doi: 10.1002/adma.201002234.

Li, Mao, et al., "Tuning the Electrochromic Properties of Poly(alkyl-3,4-ethylenedioxyselenophenes) Having High Contrast Ratio and Coloration Efficiency", Chemical Materials, 2009, pp. 2482-2488, vol. 21, American Chemical Society, doi: 10.1021/cm9003596.

Stec, Grant J., et al., "Multicolor Electrochromic Devices Based on Molecular Plasmonics", ACS NANO, 2017, pp. 3254-3261, vol. 11, American Chemical Society, ACS Publications, doi: 10.1021/acsnano.7b00364.

Tsuboi, A., et al., "Chromatic control of multicolor electrochromic device with localized surface plasmon resonance of silver nanoparticles by voltage-step method", Solar Energy Materials & Solar Cells, 2016, pp. 16-25, vol. 145, Elsevier B.V., doi: 10.1016/j.solmat.2015.07.034.

Zhang, Yu-Mo, et al., "A single-molecule multicolor electrochromic device generated through medium engineering", Light: Science & Applications, 2015, pp. 1-9, vol. 4, CIOMP, doi: 10.1038/lsa.2015.22.

Tong, Zhong-qiu, et al., "Near-infrared and Multicolor Electrochromic Device Based on Polyaniline Derivative", Chinese Journal of Polymer Science, 2014, pp. 1040-1051, vol. 32, No. 8, Chinese Chemical Society Institute of Chemistry, CAS, Springer-Verlag Berlin Heidelberg, doi: 10.1007/s10118-014-1483-0.

Ram, M.K.L.S., "A Single Active Layer Electrochromic Device", USF Available Technologies, Tech ID #17A004, Technology Transfer Office, 2007, http://www.usf.edu/research-innovation/pl/.

Dos Santos, Andre B., et al., "Review paper on current technologies for decolourisation of textile wastewaters: Perspectives for anaerobic biotechnology", Bioresource Technology, 2007, pp. 2369-2385, vol. 98, Elsevier Ltd., doi 10.1016/j.biortech.2006.11.013.

Costa, Mayara Carantino, et al., "Effect of Dye Structure and Redox Mediators On Anaerobic Azo and Anthraquinone Dye Reduction", Quimica Nova, 2012, pp. 482-486, vol. 35, No. 3.

Oakes, John and Peter Gratton, "Kinetic investigations of the oxidation of Methyl Orange and substituted arylazonaphthol dyes by peracids in aqueous solution", Journal of the Chemical Society, Perkin Transactions 2, 1998, pp. 2563-2568, doi: 10.1039/A807272H.

Sladewski, Thomas E., et al., "The effect of ionic strength on the UV-vis spectrum of congo red in aqueous solution", Spectrochimica Acta Part A, 2006, pp. 985-987, vol. 65, Elsevier B.V., doi: 10.1016/j.saa.2006.02.003.

Prasad, Anupama R. and Abraham Joseph, "Synthesis, characterization and investigation of methyl orange dye removal from aqueous solutions using waterborne poly vinyl pyrrolidone (PVP) stabilized poly aniline (PANI) core-shell nanoparticles", RSC Advances, 2017, p. 20960-20968, vol. 7, The Royal Society of Chemistry, doi: 10.1039/c7ra01790a.

Moon, K., J. Grindstaff, D. Sobransingh, A.E. Kaifer, Cucurbit [8] uril-Mediated Redox-Controlled Self-Assembly of Viologen-Containing Dendrimers, Angewandte Chemie International Edition, 43 (2004) 5496-5499.

* cited by examiner

FIG. 1

| Type of Dye | Chemical Structure | Oxidized State | Reduced State |
|---|---|---|---|
| Methyl Orange |  |  |  |
| Methyl Viologen |  |  |  |
| Eosin |  |  |  |
| Congo Red |  |  |  |
| Rhodamin B |  |  |  |

FIG. 2A

| Type of Dye | Chemical Structure | Oxidized State | Reduced State |
|---|---|---|---|
| Methylene Blue | | | |
| Allura Red | | | |

MULTICOLOR, SINGLE ACTIVE LAYER ELECTROCHROMIC DEVICES

CROSS-REFERENCE TO RELATED APPLICATION

This application claims priority to U.S. Provisional Application Ser. No. 62/572,775, filed Oct. 16, 2017, which is hereby incorporated by reference herein in its entirety.

BACKGROUND

Electrochromic devices are devices whose optical properties, such as light transmission and absorption, can be altered in a reversible manner through the application of a voltage. This property enables electrochromic devices to be used in various applications, such as smart windows, electrochromic mirrors, and electrochromic display devices.

Most commercially available electrochromic devices are relatively complex devices that comprise multiple layers (e.g., 3-5 layers) of different materials that are required for the device to change state. In addition to their complexity, such devices can require expensive processes, materials, or equipment to manufacture. Furthermore, such devices typically can only be placed in a light-transmitting state or a light-blocking state and cannot be placed in alternative colored states. In view of this, it would be desirable to have relatively simple electrochromic devices that can be placed in multiple colored states.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure may be better understood with reference to the following figures. Matching reference numerals designate corresponding parts throughout the figures, which are not necessarily drawn to scale.

DETAILED DESCRIPTION

As described above, it would be desirable to have relatively simple electrochromic devices that can be placed in multiple colored states. Disclosed herein are examples of such devices. In some embodiments, the electrochromic devices comprise a single active layer that can be transitioned from a first colored state to a second colored state by controlling the electrical potential applied across the active layer. In some embodiments, the active layer comprises a dye and a conducting polymer that both comprise a nitrogen group. When a positive potential is applied to the active layer, the dye and the conducting polymer are each oxidized and each adopts a relatively dark color. These colors combine to create a relatively dark combination color (i.e., the first colored state). When a negative (reversing) potential is applied to the active layer such that the active layer has little or no electrical potential, the dye and the conducting polymer are reduced. As a result of this reduction, the dye adopts a relatively light color, while the conducting polymer becomes completely or substantially transparent. As a result, the combination color in the reduced state (i.e., the second colored state) is primarily the color of the dye in its reduced state.

In the following disclosure, various specific embodiments are described. It is to be understood that those embodiments are example implementations of the disclosed inventions and that alternative embodiments are possible. All such embodiments are intended to fall within the scope of this disclosure.

Example electrochromic devices in accordance with this disclosure will now be discussed. It is noted that the electrochromic devices, can be used alone or can be incorporated into other objects. For example, the disclosed electrochromic devices can be used as or incorporated into display devices to change the color of the display devices. In other cases, the disclosed electrochromic devices can be used as or incorporated into windows.

Figure 1:
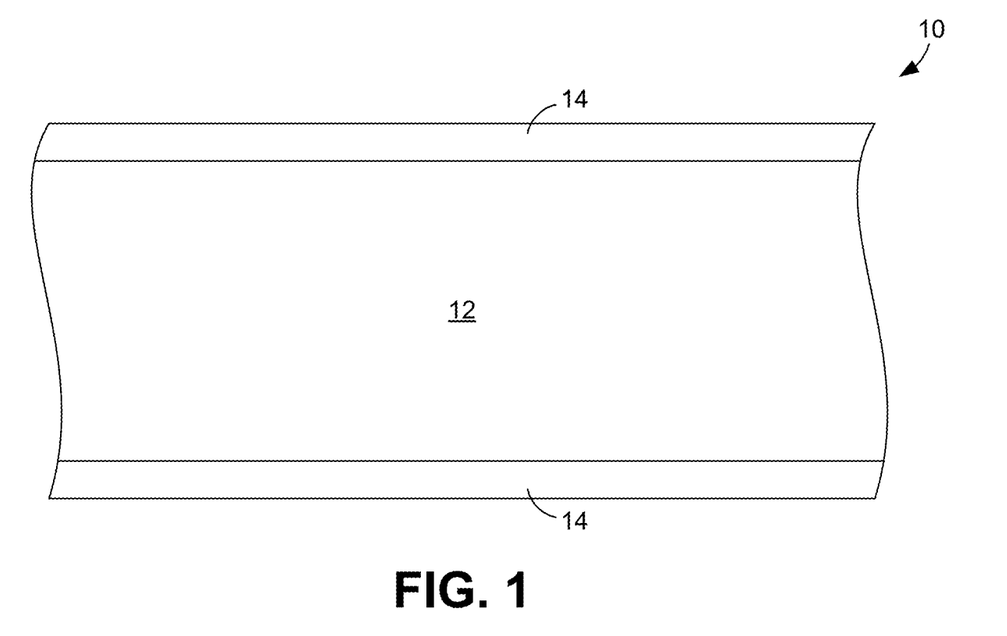
FIG. 1 is a partial side view of an embodiment of a single active layer electrochromic device.

The electrochromic devices generally comprise a single, unitary active layer of material, or "active layer," that is positioned between first and second transparent or translucent inactive layers of material, or "layers." As used herein, the term "active layer" refers to a layer of material that is configured to change color when a potential is applied to the active layer. When it is expressed that a "single" active layer is provided in the electrochromic device, this means that there is only one layer in the device that contains components that contribute to the color change reaction. Such an active layer can be contrasted with an "inactive layer," which is a layer that serves a different purpose within the device, such as simply delivering electricity to the active layer. In some embodiments, the inactive layers comprise thin transparent glass or plastic plates that are coated with a transparent, electrically conductive film. The transparent, electrically conductive films can, in some embodiments, comprise a transparent conducting oxide (TCO), such as indium tin oxide (ITO), fluorine doped tin oxide (FTO), or doped zinc oxide (ZnO). Irrespective of the composition of the transparent, electrically conductive films, the films at least cover the surfaces of the layers that face the active layer. FIG. 1 illustrates an example of a single active layer electrochromic device 10. As shown in this figure, the device 10 comprises an active layer 12 that is sandwiched between two electrically conductive inactive layers 14. Accordingly, in the example of FIG. 1, the device 10 requires only three layers and is, therefore, very simple in construction.

The active layer comprises multiple components that enable its color change capabilities. One such component is one or more base polymers that form a conducting matrix. In some embodiments, the base polymer comprises one or more water-soluble, synthetic polymers. Example water-soluble, synthetic polymers include polyvinyl alcohol (PVA), poly (vinyl acetate), poly (vinyl alcohol co-vinyl acetate), polyvinyl acetate-vinyl alcohol, poly (methyl methacrylate, poly (vinyl alcohol-co-ethylene ethylene), poly (vinyl butyral-co-vinyl alcohol-co-vinyl acetate), poly(vinyl alcohol)-acrylamide, polyvinyl butyral, polyvinyl chloride, poly(vinyl nitrate), substituted poly(vinyl alcohol), carboxylated poly(vinyl alcohol), and poly(vinyl chloride-co-vinyl acetate-co-vinyl alcohol), and mixtures thereof.

The base polymer is mixed with one or more acids to form a conducting electrolytic composition. As described above, the one or more acids can, in some embodiments, be mixed with the base polymer to form a polymer gel that is used to form the active layer. Example acids include glacial acetic acid ($CH_3COOH$), propionic acid ($C_3H_6O_2$), hydrochloric acid (HCl), hydrofluoric acid (HF), phosphoric acid ($H_3PO_4$), acetic acid (non-glacial) ($CH_3COOH$), sulfuric acid ($H_2SO_4$), formic acid ($CH_2O_2$), benzoic acid ($C_7H_6O_2$), nitric acid ($HNO_3$), phosphoric acid ($H_3PO_4$), sulfuric acid ($H_2SO_4$), tungstosilicic acid hydrate ($H_4[Si(W_3O_{10})_4] \cdot xH_2O$), hydriodic acid (HI), carboxylic acids ($C_nH_{2n+1}COOH$), dicarboxylic acid ($HO_2C-R-CO_2H$), tricarboxylic acid ($C_6H_8O_6$), oxalic acid ($C_2H_2O_4$), hexacarboxylic acid ($C_{12}H_6O_{12}$), citric acid ($C_6H_8O_7$), tartaric acid ($C_4H_6O_6$), and mixtures thereof.

The base polymer is also mixed with one or more oxidants to enable the active layer to be placed in an oxidized state. Example oxidants include aluminum nitrate ($Al(NO_3)_3$), ammonium dichromate (($NH_4)_2Cr_2O_7$), ammonium perdisulphate (APS) (($NH_4)_2S_2O_8$), barium nitrate ($Ba(NO_3)_2$), bismuth nitrate ($Bi(NO_3)_3 \cdot 5H_2O$), calcium hypoperchlorate ($Ca(ClO)_2$), copper (II) nitrate ($Cu(NO_3)_2$), cupric nitrate ($Cu(NO_3)_2$), ferric nitrate ($Fe(NO_3)_3$), hydrogen peroxide ($H_2O_2$), lithium hydroxide monohydrate (LiOH), magnesium nitrate ($Mg(NO_3)_2$), magnesium perchlorate ($Mg(ClO_4)_2$), potassium chlorate ($KClO_3$), potassium dichromate ($K_2Cr_2O_7$), potassium permanganate ($KMnO_4$), sodium hypochlorite (NaClO), sodium periodate ($NaIO_4$), zinc nitrate hydrate ($Zn(NO_3)_2$), ammonium nitrate (($NH_4)(NO_3)$), silver nitrate ($AgNO_3$), benzoyl peroxide ($C_{14}H_{10}O_4$), tetranitromethane ($CN_4O_8$), sodium perchlorate ($NaClO_4$), potassium perchlorate ($KClO_4$), potassium persulfate ($K_2S_2O_8$), sodium nitrate ($NaNO_3$), potassium chromate ($K_2CrO_4$), and mixtures thereof.

In addition to a base polymer, an acid, and an oxidant, the active layer further comprises one or more water-soluble dyes having a nitrogen group that produces a lone-pair effect (i.e., a condition in which pairs of valence electrons are present that are not shared with another atom). The dyes can be generally classified by the presence of a chromophore group. The N=N along with the bonding with one to two chromophore rings are the azo dyes. Similarly, azo chromophore, =C=O and =C=C= groups containing dyes, are called anthraquinone dyes. Because dyes are electrochemically active and higher oxidized or reduced potentials can transform the dyes, it is important to understand the reduction properties of the dyes before their use in electrochemical processes. In some embodiments, the dye or dyes used have a high reduction potential (i.e., the voltage at which a chemical species acquires electrons and thereby becomes reduced) such as greater than approximately $-0.7$ V, so that the dyes retain their color and do not breakdown when relatively small negative potentials are applied. In some embodiments, the dye or dyes used also have an oxidation potential (i.e., the voltage at which a chemical species loses electrons and thereby becomes oxidized) of approximately 2 V to $-0.7$ V, so as to be able to achieve good color contrast. Examples of such dyes include methyl orange (MO), methyl viologen (MV), eosin Y (EO), congo red (CR), rhodamin B (RB), methylene blue (MB), allura red (AR), crystal violet, acid fuschin, nigrosine, cationic dye, orange G, and mixtures thereof.

The active layer also comprises one or more conducting polymers having a nitrogen group. In some embodiments, the conducting polymer or polymers used have an oxidation and reduction potential in the range of approximately 2 V to $-0.7$ V. Example conducting polymers include polyanilines (e.g., polyaniline (PANI), poly(ortho-anisidine) (POAS), poly(o-toluidine) (POT), poly(ethoxy-aniline) (POEA)), substituted polyanilines, polypyrroles, substituted polypyrroles, polythiophenes, polyindole, polycarbazole, substituted polycarbazole, polyaniline-rhodamine, polypyrrole-rhodamine, polythiophene-rhodamine, and mixtures thereof.

Once a mixture of the various components identified above has been is formed, it can be deposited on a transparent or translucent layers using any one of a variety of techniques, including electrochemically, by solution cast, or using a self-assembly technique to form a single active layer.

When a positive potential is applied to the active layer, for example using the electrically conductive inactive layers, the dye and the conducting polymer within the active layer are each oxidized and each adopts a relatively dark color. These colors combine to create a relatively dark "combination color," i.e., a hybrid color that results from the combination of the color of the dye and the color of the conducting polymer. Because of the dark combination color produced by the dye and the conducting polymer, the active layer can, at least in some embodiments, become opaque and, therefore, prevent light from passing through the active layer. As such, the first colored state of the electrochromic device can be a light-blocking state in which the active layer prevents light from passing through the device.

When a negative (reversing) potential is later applied to the active layer such that the active layer has little or no electrical potential, the dye and the conducting polymer are each reduced. As a result of this reduction, the dye adopts a relatively light color, while the conducting polymer becomes completely or substantially transparent. As a result, the combination color for the active layer in the reduced state is primarily the light color of the dye in its reduced state. As such, the electrochromic device is placed in a second colored state that can be a light-transmitting state in which the active layer enables light to pass through the device. The particular colors and shades that result when the active layer is the oxidized (dark) and reduced (light) states depend upon the particular dyes and conducting polymers that are used, as well as the particular electrical potentials that are applied. Examples of active layers in the oxidized and reduced states are provided below.

EXAMPLE EMBODIMENTS

The general construction and operation of the disclosed electrochromic devices having been described above, specific examples of electrochromic devices will now be discussed and illustrated.

PVA+APS+dye+PANI active layers were fabricated and characterized using scanning electron microscopy (SEM), ultraviolet-visible (UV-vis) spectroscopy, cyclic voltammetry (CV), and chronoamperometric techniques. The coloration and decoloration of the active layer were studied by measuring UV-vis absorption from 350 nm to 900 nm at 2 V and −0.7 V. The cyclic voltammetry at various scan rates was also studied to understand the reversibility process and diffusion-controlled processes in the various dyes. The color-change mechanism can be understood by analyzing the redox states of dye and PANI in PVA+APS+dye+PANI active layer based electrochromic devices.

Materials and Methods

Preparation of PVA Gel:

Initially, PVA gel was prepared by dissolving 50 gm of PVA in a solution of 500 ml of 1 M HCl in a round bottom flask. The solution was heated to 80° C. and maintained at that temperature for 12 hours. Later, the solution was cooled at ambient temperature and permitted to gel for several days (more than a week before the use). In the discussions that follow, "PVA" is on occasion used to refer to this PVA gel, which includes HCl as an acid.

PVA+APS+PANI Gel

The PVA gel was used to prepare PVA+APS based gel electrolyte. Separately, 0.1 M of APS solution was prepared in 1 M HCl. 10 ml of solution (0.1 M APS in 1 M HCl) was added with 40 ml of PVA gel and stirred for an hour. The reaction with APS in PVA created the oxidized PVA+APS gel. The 50 ml gel containing PVA+APS was added with 5 ml of aniline solution with an interval of 3 minutes. The aniline was oxidatively polymerized in PVA gel in the presence of APS oxidizer. The obtained gel is referred to as PVA+APS+PANI.

Figure 2A:
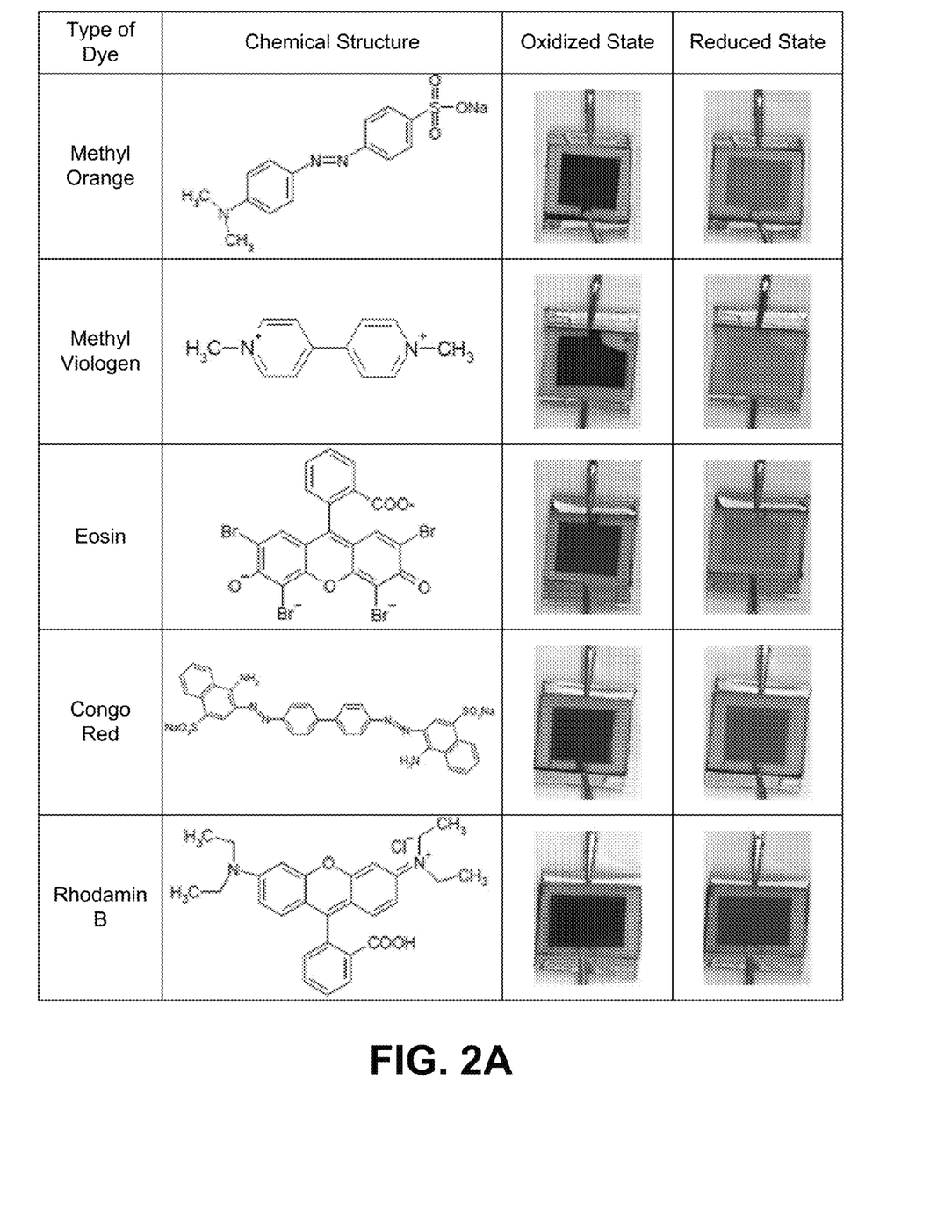
FIGS. 2A and 2B together comprise a table that identifies the chemical structures of various dyes and includes images of the oxidized and reduced states of electrochromic devices that comprise an active layer incorporating a dye.
Figure 2B:
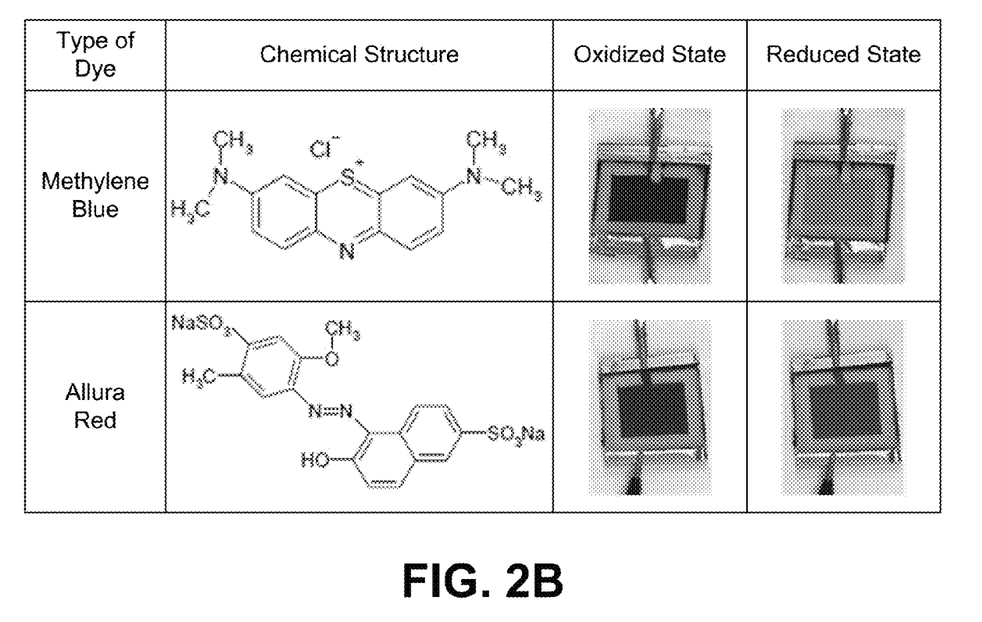
Figure 3A:
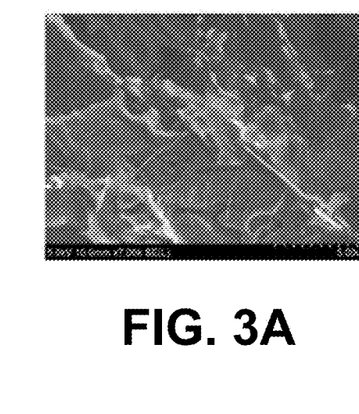
FIGS. 3A-3H are scanning electron microscopy (SEM) images of various example active layers.
Figure 3B:
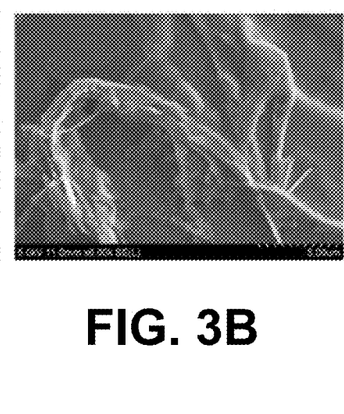
Figure 3C:
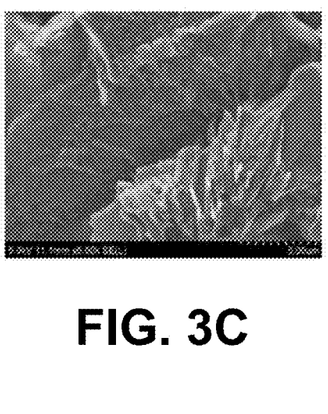
Figure 3D:
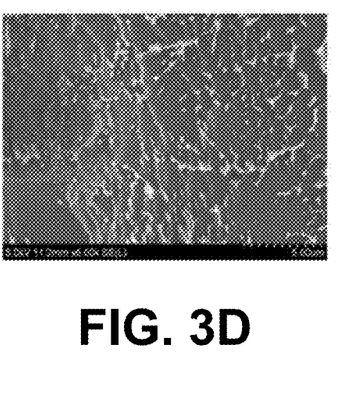
Figure 3E:
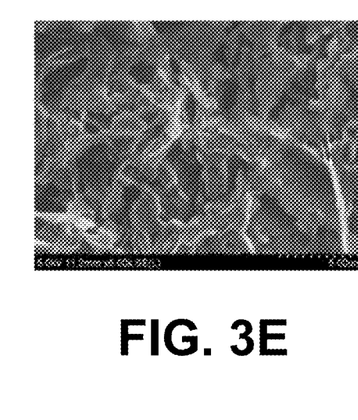
Figure 3F:
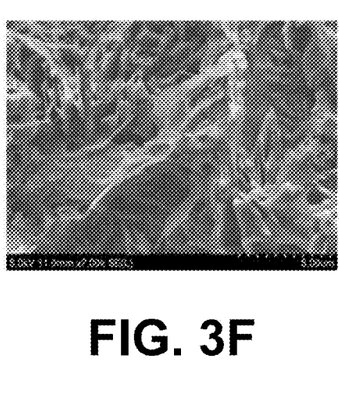
Figure 3G:
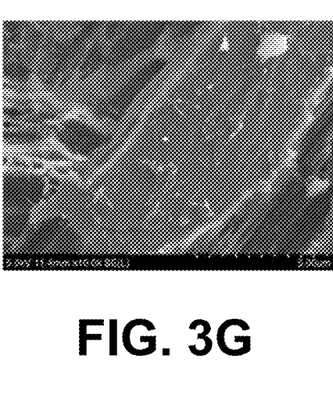
Figure 3H:
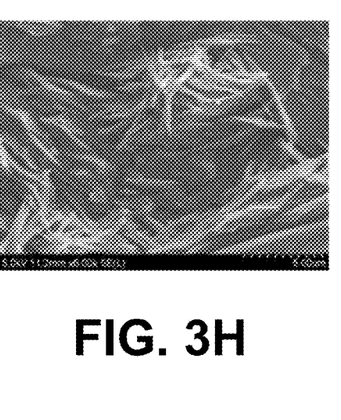

PVA+APS+dye+PANI Gel:

Initially, 0.01 M of each dye (MO, MV, EO, CR, RB, MB, and AR) was dissolved in a solution containing 0.1 M APS and 1 M HCl. The resulting solution of 10 ml was added to 3 ml at an interval with 40 ml prepared PVA+APS gel under continuous stirring conditions. Later, 5 ml of aniline was added to the solution of PVA+APS+dye (MO, MV, EO, CR, RB, MB, and AR) and stirred for 12 hours at room temperature. An exception was made for the AR dye, which was available as a semi-solid product. 5 ml of AR dye was added to 10 ml of the PVA+APS+dye+PANI gel, which is very stable and can be stored for months. Table 1 identifies each dye in the preparation of PVA+APS+dye (MO, MV, EO, CR, RB, MB, or AR)+PANI based active electrochromic material. FIGS. 2A and 2B show the structures of various dyes and oxidized and reduced states of dye containing active layer based electrochromic devices (the images were obtained from video in the oxidized state at a potential of 2 V and the reduced state at a potential of −0.7 V).

TABLE 1

Experimental conditions and gels used to obtain a single active layer electrochromic material.

| No. | Active layer gel | Dye added in 10 ml of (0.1M APS + 1M HCl (0.01M)) | 40 ml of PVA gel with HCl | Aniline | Reaction of aniline with PVA + APS + dye |
|---|---|---|---|---|---|
| 1 | PVA + APS + MO + PANI | 0.1636 g | 40 ml | 5 ml | 12 hrs. |
| 2 | PVA + APS + MV + PANI | 0.1285 g | 40 ml | 5 ml | 12 hrs. |
| 3 | PVA + APS + EO + PANI | 0.3239 g | 40 ml | 5 ml | 12 hrs. |
| 4 | PVA + APS + CR + PANI | 0.3483 g | 40 ml | 5 ml | 12 hrs. |
| 5 | PVA + APS + RB + PANI | 0.2395 g | 40 ml | 5 ml | 12 hrs. |
| 6 | PVA + APS + MB + PANI | 0.1599 g | 40 ml | 5 ml | 12 hrs. |
| 7 | PVA + APS + AR + PANI | Added 5 ml (conc. sol) | 40 ml | 5 ml | 12 hrs. |

Results and Discussions

SEM Studies:

FIG. 3 shows SEM pictures of PVA+APS+PANI and PVA+APS+dye (MO, MV, EO, CR, RB, MB or AR)+PANI as an active layer deposited between two FTO-coated glass plates. The solution of each dye-containing active layer material was spread on FTO-coated glass plate and left to dry for 24 hours. Later, the samples were heated at 40-50° C. to remove any water, which could have evaporated after normal drying at room temperature. FIG. 3A shows a PVA gel having a PANI structure. The film shows both flat and rough surfaces arising due to the drying process. FIG. 3B shows axe-like structures in the dried the PVA+APS+MO+PANI layer. However, more flake-like structures are visible throughout the surface dried in the PVA+APS+MV+PANI film, as shown in FIG. 3C. FIG. 3D shows a rougher and charged surface due to SEM beam potential certainly due to less conducting surface. Nearly equal flakes are randomly packed in the gel containing the PVA+APS+CR+PANI based single layer structure in FIG. 3E. The RB dye in the PVA+APS+RB+PANI layer shows mountain and valley structures beside sharp needle structures throughout the surface in FIG. 3F. FIG. 3G shows a layered and smooth structure in the PVA+APS+MB+PANI layer due to presence of MB dye. However, the AR dye layer reveals uniformly distributed wires or needles throughout the structure. The presence of dye changes the morphology of the PVA+APS+PANI based structure.

Figure 4:
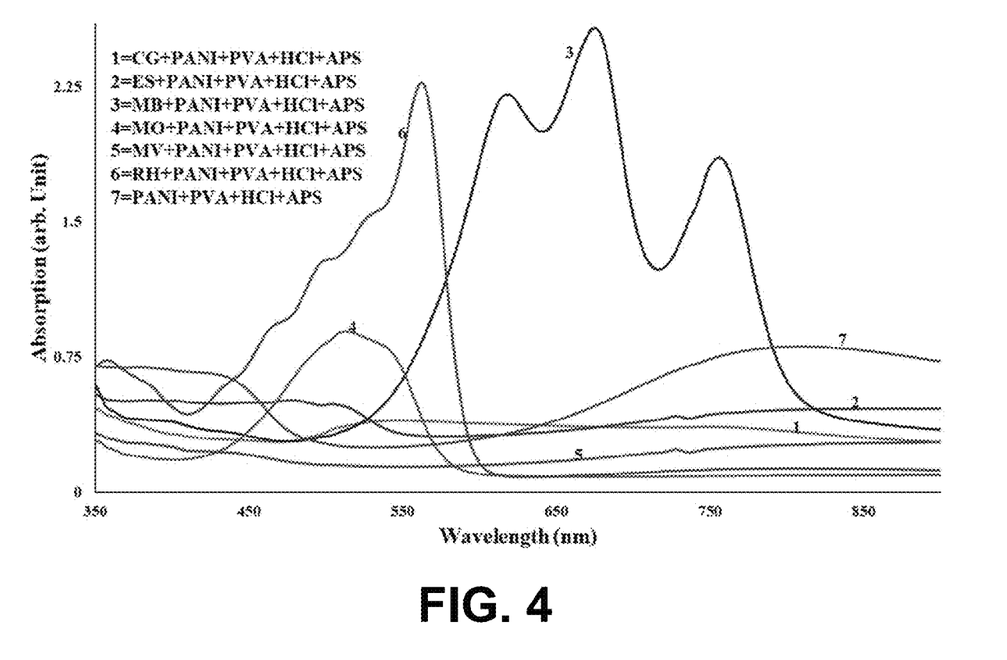
FIG. 4 is a graph that shows the UV-visible absorption spectra of active layers containing various example dyes.

UV-Vis Studies:

Curve 1 in FIG. 3 shows UV-vis absorption of the PVA+APS+PANI based active layer film coated on a glass plate. The curve shows absorption peaks at 807, 498, 421, and 390 nm. The peaks at 421 and 498 nm are due to polaron and bipolaron states, however, the doping shows a wide peak at 807 nm. The peak at 390 nm is due to $\pi$-$\pi$* transition. The peak at 498 to 421 nm is due to the presence of MO dye due to the azobenzene group and shifted from characteristics 465 nm. Curve 2 in FIG. 4 shows the absorption peaks for the PVA+APS+MO+PANI layer at 538, 516, 496, 456, and 374 nm. The curve has characteristic MO peaks, MO being an anionic dye and the absorption peaks are shown at 538 and 516 nm. Curve 3 of FIG. 4 shows absorption peaks positioned at 858, 829, 663, 575, 502, 428 and 377 nm for the PVA+APS+MV+PANI layer. The MV dye had characteristic peaks at 377 and 577 to 502 nm due to the cationic radical, which could be due to oxidizer. The curve shows characteristic absorption peaks of MV dye at 663, 572 and 402 nm. The MV had a characteristic peak at 446, however, it was shifted 406 nm.

The UV-vis absorption peaks for the PVA+APS+ES+PANI layer are shown in Curve 4 of FIG. 4. The curve reveals peaks at 828, 506, 482, 447, 405, 381, and 364 nm. Curve 5 shows the UV-vis peaks at 828, 506, 482, 447, 405, 381 and 364 nm due to the presence of CR in PVA+APS+ CR+PANI. The peak observed at 482 nm is due to the CR red dye and blue shifted due to the concentration of acid in the structure. The characteristic RB is shown in Curve 6 of FIG. 4 at 561, 530, 499, 468, 438, 387, and 360 nm, and characteristic MB and PANI peaks are shown in Curve 7 of FIG. 4 at 758, 738, 676, 619, 498, 445, 404, and 362 nm. Regardless, the peaks of dominant PANI and dye in each UV-vis absorption curve have the absorption peaks at around 800 nm due to the presence of the dopant form of PANI.

Figure 5A:
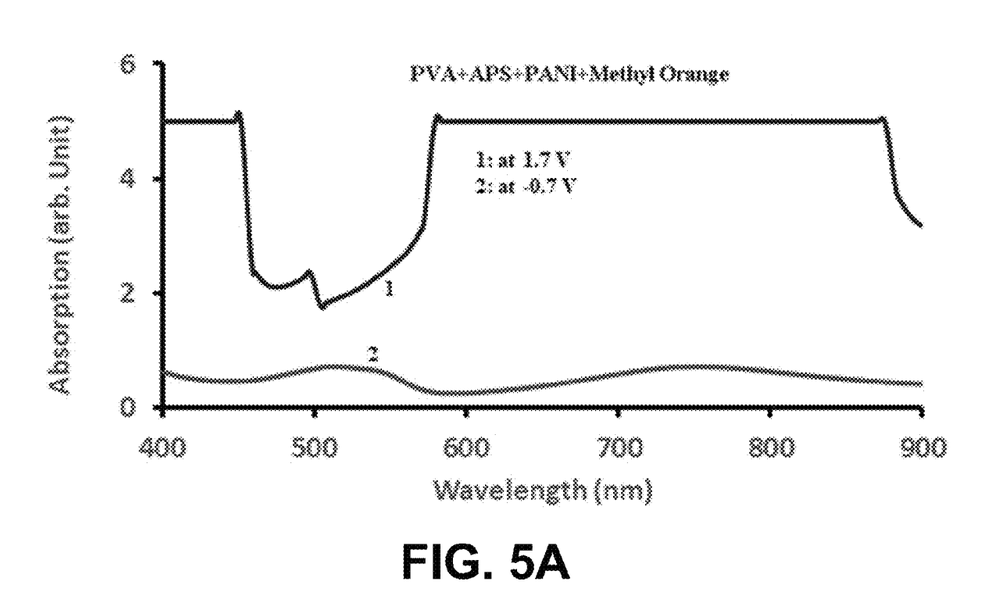
FIG. 5A-5C are graphs that show the change of UV-vis absorption at potentials 1.7 and −0.5 V for various example active layers.
Figure 5B:
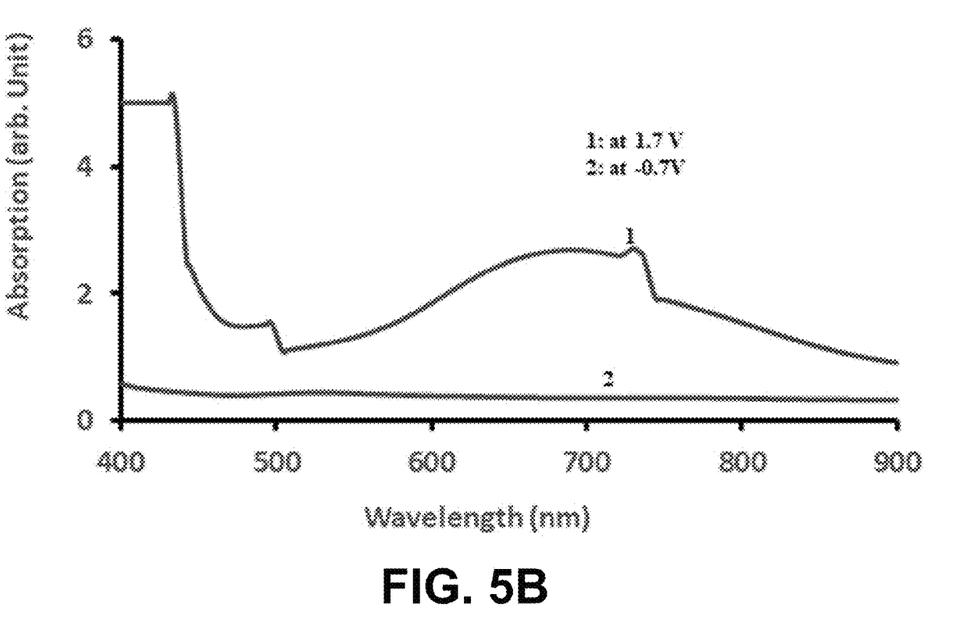
Figure 5C:
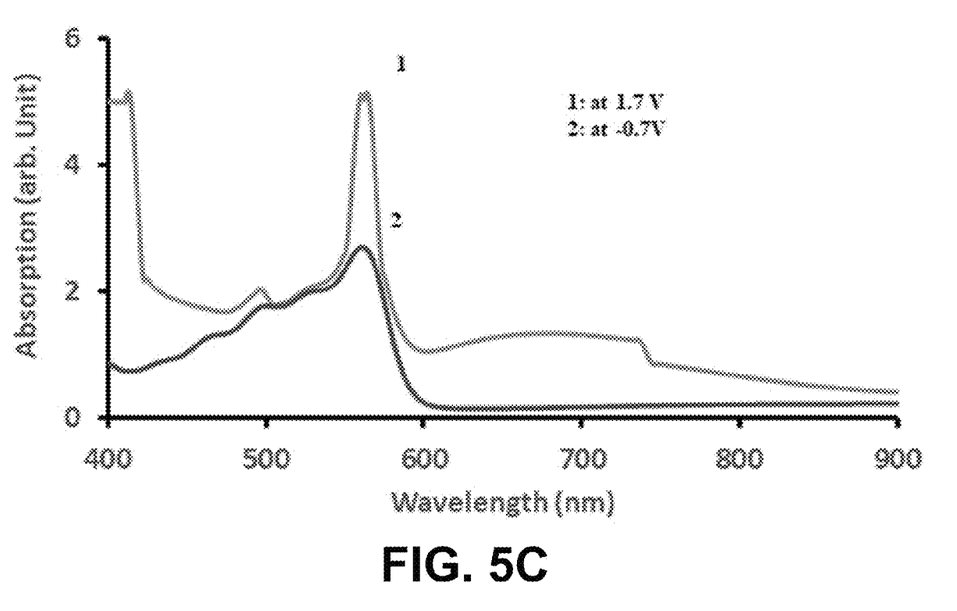

FIG. 5A shows the UV-vis absorption of PVA+APS+ MO+PANI at 1.7 V (Curve 1) and −0.5 V (Curve 2). Interestingly, the absorption magnitude at 1.7 V saturates the absorption from 600 to 870 nm, whereas the characteristic color (light red-pinkish color) is observed at −0.7 V. A purple-pinkish color is also observed for the single layer electrolyte for the potential at −0.5 V for PVA+APS+CR+ PANI layer in FIG. 5B (Curve 1). The presence of CR dye provides the dark color, and the color contrast is different than with the presence of MO dye in the single layer gel in FIG. 5B (Curve 3). FIG. 5C shows variation of dark to red color when the potential is applied at −0.5 V to 1.7 V. The sharp characteristic peak at 561 nm peak is present at the oxidized potential (Curve 1) and the reduced potential at −0.5 V (Curve 2) in FIG. 5C.

Figure 6A:
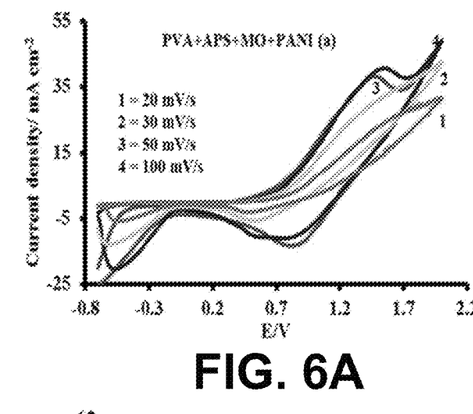
FIGS. 6A-6F are graphs that show the cyclic voltammetry (CV) of various example active layers containing PVA+APS+PANI gel.
Figure 6B:
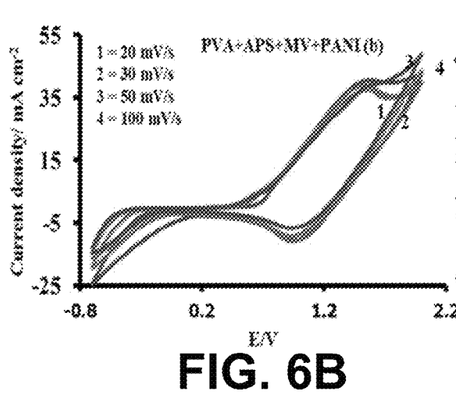
Figure 6C:
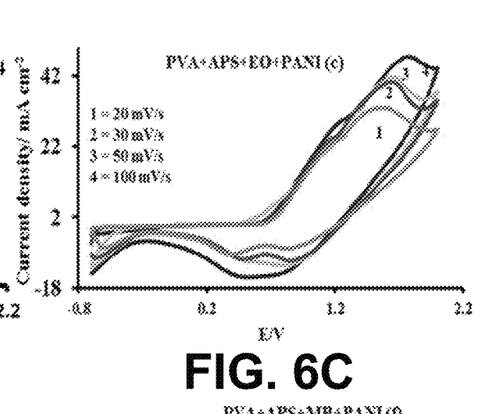
Figure 6D:
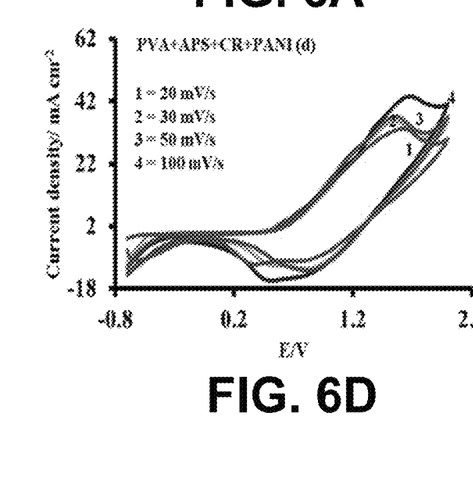
Figure 6E:
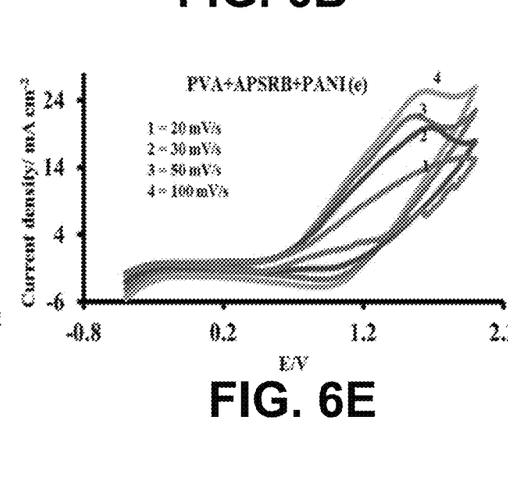
Figure 6F:
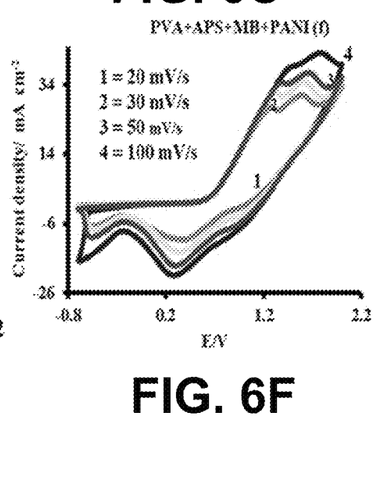
Figure 7A:
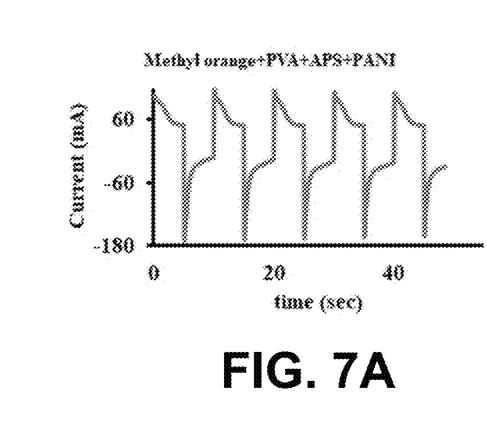
FIGS. 7A-7F are graphs that show the results of chronoamperometric studies of various example active layers.
Figure 7B:
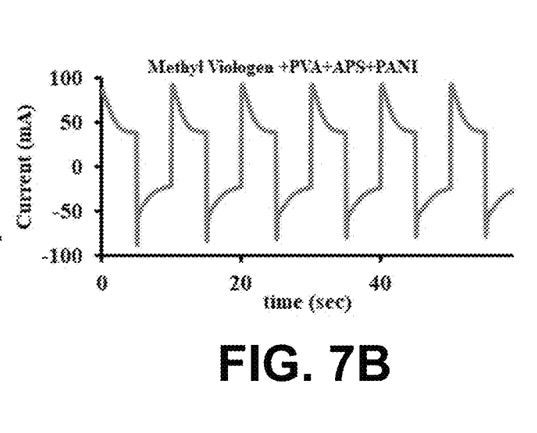
Figure 7C:
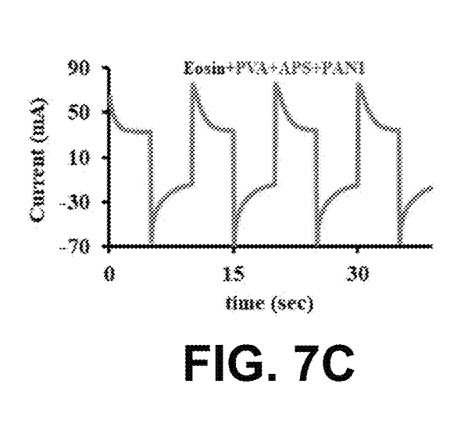
Figure 7D:
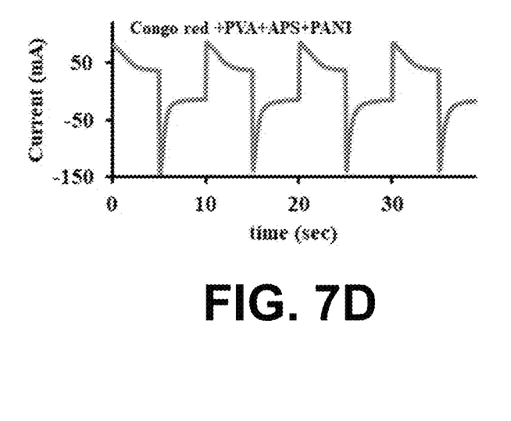
Figure 7E:
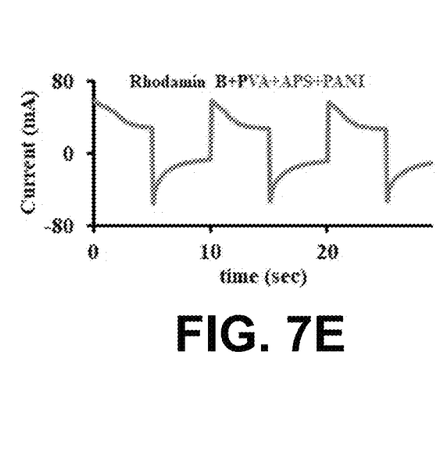
Figure 7F:
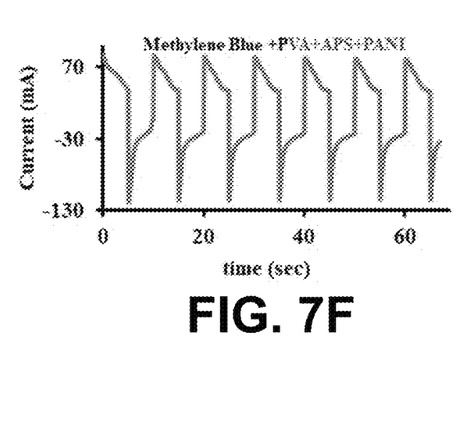

Cyclic Voltammetry Studies:

CV studies on PVA+APS+dye (MO, MV, EO, CR, RB, MB or AR)+PANI active layer sandwiched between two conducting FTO-coated glass plates were also studied. FIG. 6A shows the CV studies of the PVA+APS+MO+PANI layer at various scan rates. The CV shows the complete CV curve and it is reversible, however, there is a change in the CV pattern at different scan rates due to changes in the diffusion properties of the active layer. However, it shows the oxidation peak at 1.55 V and reduction peaks at 0.81 V and −0.58 V. The oxidation peak is related to the oxidized pernigraniline state as well as the oxidized state of the MO dye dark color, whereas the two reduction peaks are due to the emeraldine and leucoemeraldine forms of PANI. The pinkish color is reduced for the MO dye, which has appeared in at potential −0.7 V. The CVs of the PVA+APS+MV+PANI active layer shows an oxidation peak at 1.55 V and two reduction peaks 0.95 V and −0.59 V. The PANI is reduced to leucoemeraldine. The CVs of PVA+APS+EO+PANI active layer shows oxidation peak at 1.54 V and reduction peaks at 0.92 and −0.563 V (FIG. 6C) similar to the PVA+APS+ MV+PANI active layer in FIG. 6B. The MV under goes the two reduction states between −0.4 to −1.1 V, where we have only scanned till −0.7 V. So, only one reduction state can be observed. However, the presence of CR dye in the PVA+ APS+CR+PANI active layer shows a pinkish color at reduced states. It has the oxidation peak at 1.657 V and reduction peaks at 0.45 V and −0.63 V (FIG. 6D). An interesting color feature has been observed for RB dye in the PVA+APS+RB+PANI active layer. It has oxidation peak at 1.62 V and the reduction peak at 0.993 V, as shown in FIG. 6E. However, the complete leucomeraldine peak is missing due to the presence of RB dye, which has a higher native reduction potential, and the active layer color is dominated by the presence of RB dye. The presence of MB dye shows a similar effect as observed previously. It has oxidation peaks at 1.32 V and 1.8 V and the reduction peaks are at 0.89, 0.29, and −0.58 V. The complete leucoemeraldine state can be achieved in presence of MB dye in PVA+APS+MB+ PANI as active layer, as shown in FIG. 6E.

FIG. 7 shows the chronoamperometric results of PVA+ APS+PANI and PVA+APS+dye (MO, MV, EO, CR, RB, MB)+PANI active layer deposited on FTO-coated glass plates. The oxidation and reduction process is asymmetric in each electrochromic device. There is a marked difference between the oxidation and reduction processes in the active layer containing CR and RB dye than the rest of studied dyes. The reduction is sharper in each studied active layer. However, oxidation shows two oxidizing phases in each studied dye-based active layer.

Color-Change Mechanism

An attempt was made to understand the mechanism of coloration and decoloration using various devices containing a dye-based active layer between two FTO-coated glass plates. The oxidation of each dye results in a dark color regardless of the nature of dye, whereas PANI changes to pernigraniline in the potential range of 1.5 to 1.8 V and dye is also oxidized to darker color. The combination colors are even darker in the oxidized states. However, the two switching color states can be observed when the reduction of the dye is at a potential higher than −0.7 V or the colored reduction state is present at a potential of −0.7 V.

Figure 8:
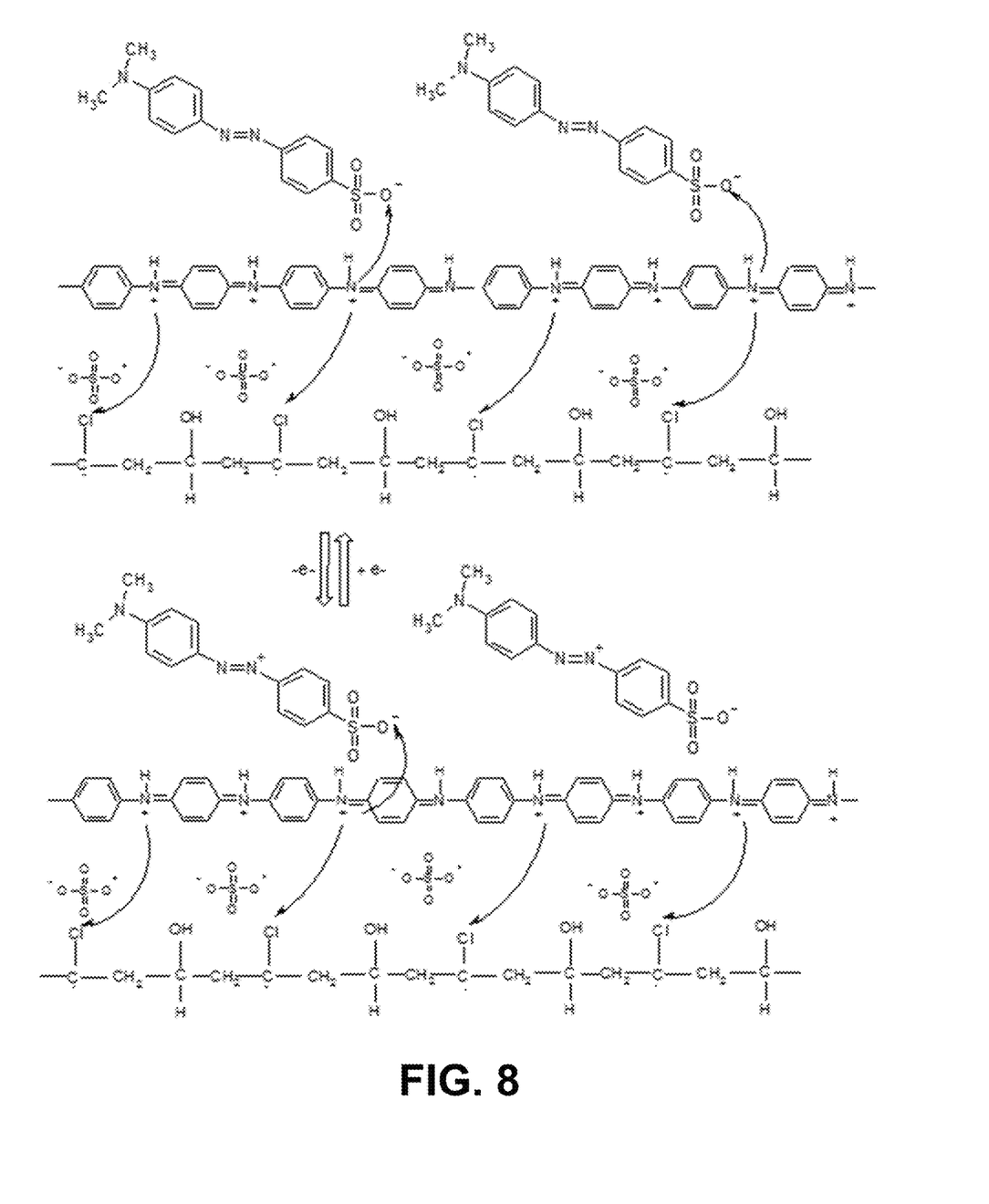
FIG. 8 is a schematic that illustrates an example mechanism for coloration and decoloration of PVA+APS+MO+PANI based active layers.
Figure 9:
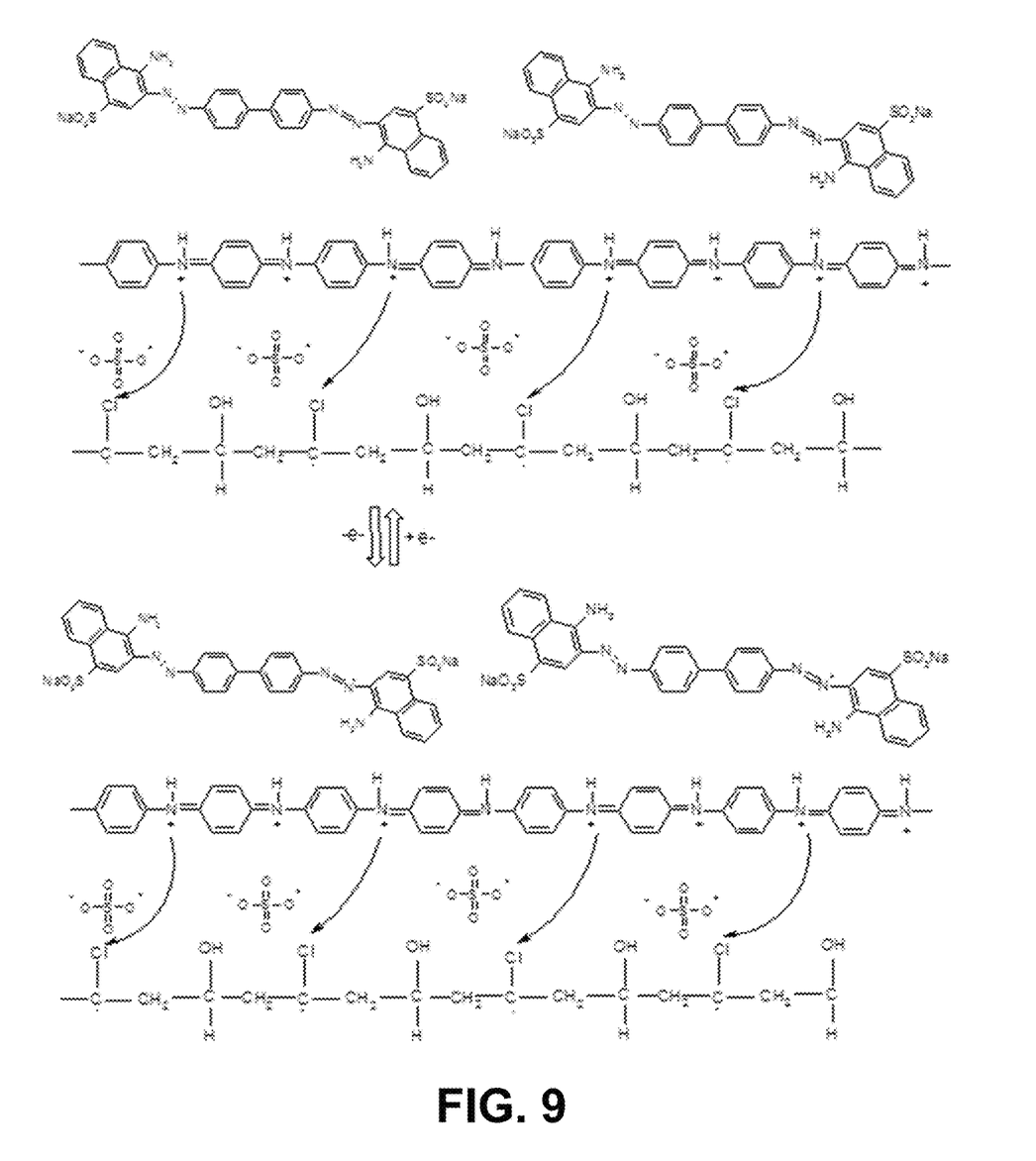
FIG. 9 is a schematic that illustrates an example mechanism for coloration and decoloration of PVA+APS+CR+PANI based active layers.

FIG. 8 shows the oxidation and reduction states of a PVA+APS+MO+PANI based active layer. It is interesting to note that the oxidation state is related to an oxidized state of nitrogen in the MO dye as well as in the PANI structure. The reduction brings to original state of MO dye for the reduction potential is between −0.7 V. So, a purple-pinkish color to dark color is observed in the MO-based electrochromic device. FIG. 9 shows the oxidation of CR dye at a nitrogen bond in the dye structure. The oxidation and reduction are similar to MO-based active layers. The reduction shows the purple color, which is the reduction state.

Figure 10:
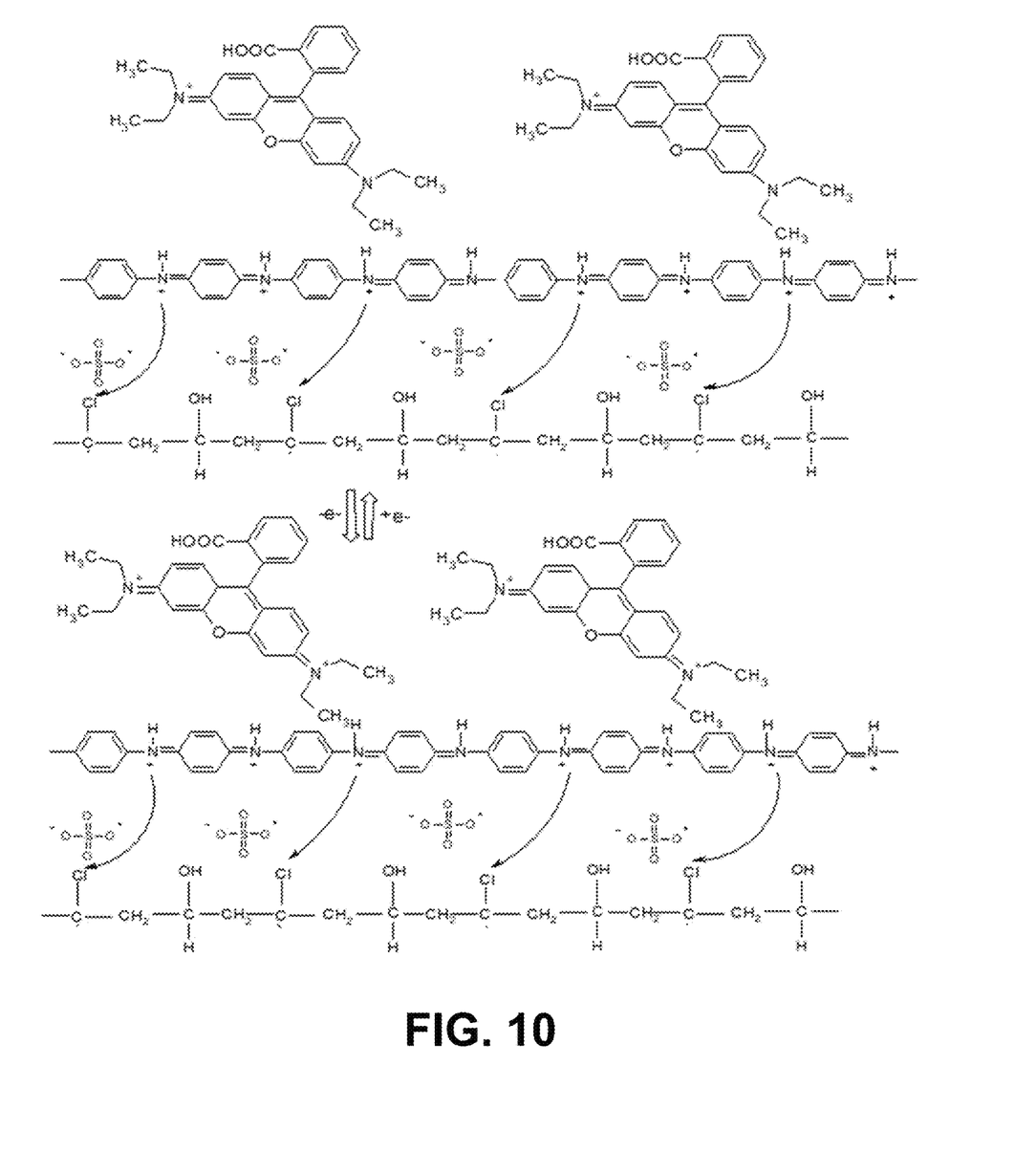
FIG. 10 is a schematic that illustrates an example mechanism for coloration and decoloration of PVA+APS+RB+PANI based active layers.

The most interesting color contrast between two color states was observed for RB dye containing active layers. The nitrogen group partially oxidizes in the RB dye and the reduction shows the return of a red state of the RB dye in the active layer (see FIG. 10). However, the oxidation and reduction of PANI occurs in the potential range from 2.0 V to −0.7 V. RB dye is dominant in the reduction potential and a red to dark color has been observed.

In conclusion, color change between two colored states (e.g., red to black, red to blue, purple to black, etc.) of an electrochromic device has been described. A PVA gel containing PANI and APS was tested with various dyes. It is important to understand the electrochemistry of each dye with the PVA+APS+PANI system. The oxidation and reduction characteristics of each dye is important and the oxidation potential of the dye should be below 2.0 V whereas the reduction potential of the dye should be greater than −0.7 V. The reduction potential of the dye should be high to retain its color, otherwise only dark to transparent states will be possible. The mechanism of multicolored states has been understood using chemical structures.

The invention claimed is:

1. An electrochromic device comprising:
  a single unitary active layer comprising a dye having a nitrogen group and a conducting polymer having a nitrogen group, wherein the single unitary active layer has a first color in an oxidized state and a second color in a reduced state;
  wherein the dye having a nitrogen group comprises one or more of methyl orange (MO), methyl viologen (MV), eosin Y (EO), congo red (CR), rhodamin B (RB), methylene blue (MB), allura red (AR), crystal violet, acid fuschin, nigrosine, cationic dye, and orange G;

wherein the electrochromic device comprises no other active layer; and wherein the conducting polymer having a nitrogen group is a polyaniline and the single unitary active layer further comprises polyvinyl alcohol (PVA), hydrochloric acid (HCl), and ammonium perdisulphate (APS) ((NH4)2S2Oa).

2. The electrochromic device of claim 1, further comprising first and second transparent or translucent layers of material between which the single unitary active layer is positioned.

3. The electrochromic device of claim 2, wherein the device comprises no other layers of material other than the single unitary active layer and the first and second transparent or translucent layers.

4. The electrochromic device of claim 2, wherein the first and second transparent or translucent layers comprise thin transparent glass or plastic plates that are coated with a transparent electrically conductive film.

5. The electrochromic device of claim 1, further comprising a voltage source configured to apply an electrical potential to the single unitary active layer.

6. The electrochromic device of claim 1, wherein the single unitary active layer is configured to be placed in the oxidized state when a positive electrical potential is applied to the single unitary active layer and is configured to be placed in the reduced state when the positive electrical potential is reversed by applying a negative electrical potential to the single unitary active layer.

7. The electrochromic device of claim 6, wherein the first color is a relatively dark combination color that results from oxidation of both the dye and the conducting polymer and the second color is a relatively light combination color that results from reduction of both the dye and the conducting polymer.

8. The electrochromic device of claim 6, configured to have values of said positive and negative electrical potentials applied to the single unitary active layer range from approximately 2 V to −0.7 V.

9. An electrochromic device comprising:
a single unitary active layer that has a first color in an oxidized state and a second color in a reduced state, the single unitary active layer including:
a base polymer,
an acid,
an oxidant,
a dye having a nitrogen group, and
a conducting polymer having a nitrogen group; and
first and second transparent or translucent layers of material between which the single unitary active layer is provided; and
wherein the device comprises no other layers of material and:
the base polymer is polyvinyl alcohol (PVA);
the acid is hydrochloric acid (HCl);
the oxidant is ammonium perdisulphate (APS) ((NH4)2S2Os); and
the conducting polymer having a nitrogen group is polyaniline (PANI).

10. The electrochromic device of claim 9, wherein the single unitary active layer is configured to be placed in the oxidized state when a positive electrical potential is applied to the active layer and is configured to be placed in the reduced state when the positive electrical potential is reversed by applying a negative electrical potential to the single unitary active layer.

11. The electrochromic device of claim 10, wherein the first color is a relatively dark combination color that results from oxidation of both the dye and the conducting polymer and the second color is a relatively light combination color that results from reduction of both the dye and the conducting polymer.

12. The electrochromic device of claim 11, configured to have values of said positive and negative electrical potentials applied to the single unitary active layer range from approximately 2 V to −0.7 V.

* * * * *